United States Patent
McAnespie

[11] 3,833,205
[45] Sept. 3, 1974

[54] APPARATUS FOR ELIMINATING WATER VAPOR FROM PROCESSED AIR

[75] Inventor: Donald McAnespie, La Salle, Quebec, Canada

[73] Assignee: Midland-Ross Corporation, Cleveland, Ohio

[22] Filed: Feb. 2, 1972

[21] Appl. No.: 212,983

[52] U.S. Cl............ 261/133, 261/147, 261/153, 261/16, 261/65, 261/112, 55/222, 55/241, 55/257, 55/269
[51] Int. Cl............................................. B05b 1/28
[58] Field of Search ........ 261/65, 112, 16, 17, 153, 261/156, 152, 147, 133, 128, 21; 55/222, 223, 241, 257, 259, 267, 269

[56] References Cited
UNITED STATES PATENTS

| | | | |
|---|---|---|---|
| 1,147,484 | 7/1915 | Cramer | 55/269 X |
| 1,966,275 | 7/1934 | Wright | 261/133 X |
| 2,002,019 | 5/1935 | Marzolf | 261/153 X |
| 2,084,408 | 6/1937 | Mueller | 55/269 X |
| 2,522,086 | 9/1950 | Berlowitz | 261/133 X |

FOREIGN PATENTS OR APPLICATIONS 709,008  6/1941  Germany .............................. 261/21

Primary Examiner—Frank W. Lutter
Assistant Examiner—William Cuchlinski, Jr.

[57] ABSTRACT

Apparatus and method for eliminating water vapor from processed exhaust air of a dryer. The exhaust air is placed in indirect heat exchange relationship with ambient air after which it is cooled by passing through a water shower. The cooled exhaust is then mixed with the ambient air which has passed through the heat exchanger and at least a portion of the mixture is discharged to the atmosphere.

4 Claims, 1 Drawing Figure

PATENTED SEP 3 1974    3,833,205
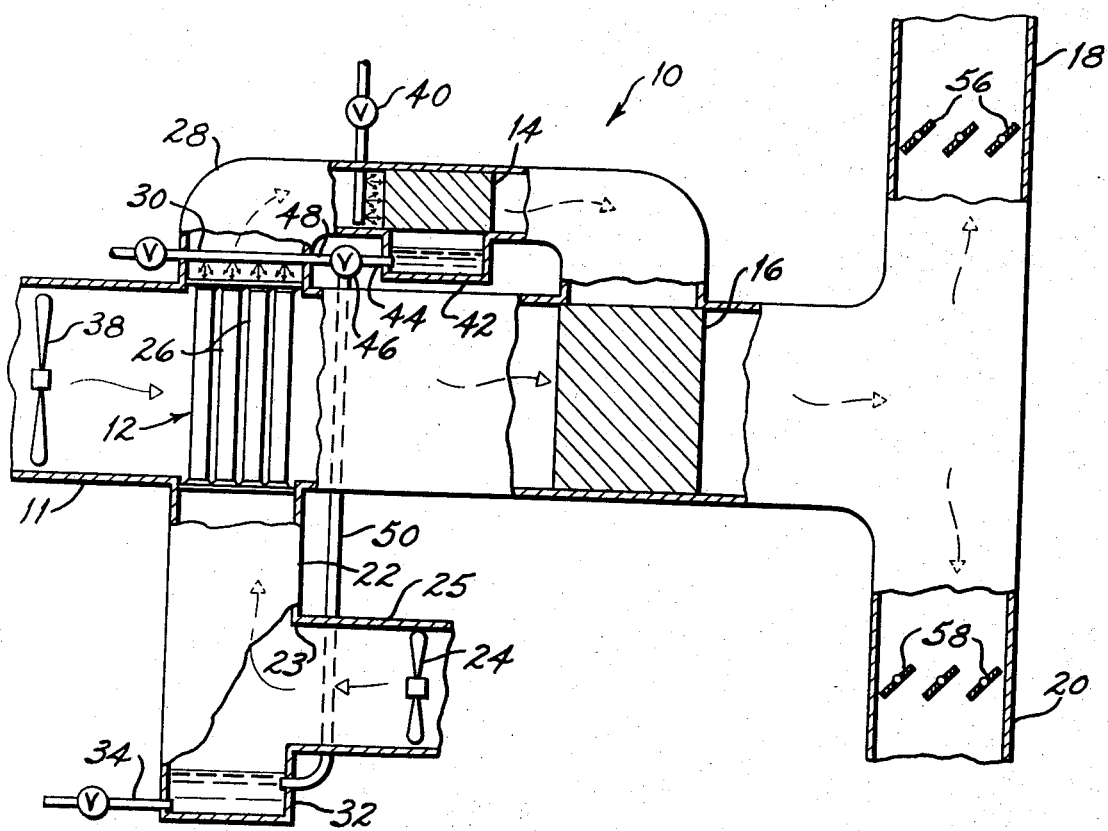

APPARATUS FOR ELIMINATING WATER VAPOR FROM PROCESSED AIR

Most industrial drying processes exhaust moisture laden air to the atmosphere. When these exhaust gases come in contact with the ambient outdoor air at various temperatures and humidities, the water vapor condenses and causes a visible plume. This plume is objectionable for several reasons, particularly when the discharge is in the vicinity of streets and/or highways. The plume can obstruct vision, intensify existing ground fog, and when the temperature is below freezing, can result in icing on the highways.

The plume is created when the high humidity exhaust air mixes with the ambient outdoor air. The cooling effect of mixing the two gases overcomes the diluting effect of this same mixing, resulting in a supersaturated mixture. The portion of water vapor above and beyond saturation is the water droplets visible as plume.

Several methods are available for avoiding the problems caused by a plume. The first is to install a stack high enough so that the plume does not come in contact with the ground. Such a stack is often expensive to erect and does not yield any return on investment. A second solution often used is to install gas-fired or oil-fired burners in the exhaust to add sensible heat. In this way, when mixing takes place with outdoor air, the reduction in temperature does not overtake the dilution due to mixing, thus no plume results. Even though the plume is eliminated, the amount of vapor discharged into the atmosphere is not reduced; in fact, the amount of vapor is increased because of its presence in the products of combustion. A third method is to reduce the amount of water vapor in the exhaust air by spraying an abundant amount of cold water into the air stream. This reduces the temperature of the exhaust to saturation resulting in condensation in the exhaust duct, then less water vapor is exhausted at the point of discharge. To eliminate the plume using this method, ambient air is heated with burners or steam coils and is mixed with the cooled exhaust air so that the resulting mixture when exhausted does not form a plume.

It is readily obvious that each of the above methods has distinct drawbacks either in terms of cost or efficiency. It would obviously be advantageous to eliminate the plume through economical and convenient means and methods.

It is, therefore, an object of this invention to provide an apparatus for eliminating water droplets from exhaust air emitted from a drying apparatus.

It is another object of this invention to provide a method for reducing the humidity of exhaust air.

It is still another object of this invention to provide a means for utilizing heat contained in exhaust gas which otherwise would be lost.

It is a further object of this invention to provide means and methods of heating water for industrial uses which heat is provided from the exhaust gases of a drying system.

Referring now to the drawing, the single FIGURE shows schematically a drying system which incorporates the principles of this invention.

An exhaust air dehumidifying system is shown generally at 10 and comprises a central duct 11, a heat exchanger 12, an eliminator 14, a dilution chamber 16, an exhaust stack 18 and a recirculating duct 20.

Located within the central duct 11 is the heat exchanger 12 which has, at the lower portion thereof, a duct 22 having an opening 23 at the side thereof. The opening 23 receives a side duct 25 containing exhaust processed air or gas. The exhaust air or gas (hereinafter also called "processed air") is driven by a fan 24 located within the side duct 25 which directs the processed air as indicated by the arrows. The heat exchanger 12 has a plurality of passageways or tubes 26 which receive the processed air flowing from duct 22. Intermediate the heat exchanger 12 and the eliminator 14 is an arched duct 28 which contains a water spray 30 located immediately above the heat exchanger for discharging water into the tubes into contact with the interior surfaces of the tubes and the processed air passing upwardly therethrough. Positioned at the bottom portion of the duct 22 is a sump 32 having a drain 34 therein.

The central duct 11 is in communication with the atmosphere and has a fan 38 located at its upstream end, which fan directs ambient air as indicated by the arrow. The eliminator 14 has a second shower 40 therein. At the lower portion of the eliminator 14 is a sump 42 having a drain 44 connected thereto. The drain has a valve 46 and two branches 48 and 50. The first branch 48 is in contact with the water spray 30 and the second branch 50 leads to the first sump 32.

The dilution chamber 16 is received within the central duct 11 and is located downstream from the heat exchanger, the dilution chamber being in communication therewith. The downstream end of the central duct 11 is confluent with the exhaust stack 18 and the return duct 20. The exhaust stack 18 and return duct 20 have dampers 56 and 58, respectively, located therein.

In operation, the processed air is blown into the duct 22 by the fan 24 and subsequently flows through the pipes 26. The processed air is normally at an elevated temperature and moisture laden. Fresh air is blown through duct 11 by the fan 38 and contacts the pipes 26 thereby establishing a thermal exchange between the ambient air and the processed air which effects heating of the ambient air and cooling of the processed air. The water sprays 30 direct water in a countercurrent relationship to the processed air thereby also tending to cool the processed air and condense water vapor therefrom. The water is collected in the sump 32 located below the heat exchanger. After contacting the water spray within the duct 28, the processed air then passes through the eliminator 14 where it is sprayed once more with water from the second water spray 40 to effect further cooling and dehumidification of the processed air. The water is collected in a sump 42 located immediately below the eliminator 14. It will be noticed that the processed air is traveling in a horizontal direction thereby tending to drop any water droplets contained therein.

As the treated processed air leaves the arched duct 28 downstream from the eliminator 14, it enters into a dilution chamber 16 located within the central duct 11. Here the treated processed air is mixed with the fresh air which has been heated in the heat exchanger 12. This mixture of the gases is particularly advantageous as the relatively lower temperature of the ambient air indirectly aids in condensing the vapor in the processed air at the heat exchanger whereas the elevated temperature of the ambient air downstream from the heat exchanger aids in reducing the relative humidity after the gases are mixed. The mixed gases will then have a relatively low humidity as a result of the processing which had previously taken place as well as the utilization of ambient air. Downstream of the dilution chamber 16 two branches are available for the mixed gas. This mixed gas may either be exhausted to the air through the exhaust stack 18 or the exhaust stack 18 may be closed by the dampers 56 and the mixed air will pass through the return duct 20 whose dampers 58 would be open.

In experiments undertaken to determine the effectiveness of the vapor eliminator system 10, it was found that a very satisfactory air may be released through the exhaust ducts 18. In this experiment the processed air had a temperature of 150°F and a relative humidity of 70 percent. The ambient air was at a temperature of 30° and had a relative humidity of 50 percent. This air was indirectly heated to 70°F by passing it through a heat exchange relationship with the processed air. After treating the processed air in the system 10, the air coming from the exhaust stack 18 was analyzed and found that the temperature of the same was 80°F and the relative humidity was 60 percent.

The primary advantage of the system is that the plume normally associated with the drying systems is eliminated. There are also certain byproducts to the system that are most advantageous. Where a need exists for warm water in an unrelated operation, the warm water may be supplied from the water showers 30 and 40. To obtain a maximum temperature for the water given off through drain 34, valve 46 would be opened thereby allowing the water in drain 42 to flow through the water spray 30. Obviously the water in drain 42 will have been heated by contact with the processed air in the eliminator 14. The water out of spray 30 will subsequently be heated by contact with the processed air in the heat exchanger 26.

Another advantage of the process is that the treated air may be used for additional purposes such as drying. The various steps of the process result not only in a cooler air of lower relative humidity, but also in a treated air having impurities removed. The water showers 30, 40 remove impurities from the processed air thus rendering it suitable for further uses.

What is claimed is:

1. An apparatus for eliminating vapor from vapor laden process exhaust gas having an elevated temperature whereby it may be discharged into the atmosphere without the formation of plume comprising:

indirect heat exchange means having first and second passages, means for directing a heated vapor laden gas through said first passage to effect cooling of said gas, separate means for directing ambient air through said second passage to effect heating of said ambient air, said passages being separated by wall means through which heat exchanging between said gas and said ambient air is effected, cooling means comprising a first water spray located within portions of said heat exchange means through which said gas passes, and said spray drains through said first passage and in contact with said wall means to effect further cooling of said gas and yielding up of vapor, means for mixing said gas and said ambient air emerging from said heat exchange means, and means for exhausting at least a portion of the mixed air and gas to the atmosphere.

2. The apparatus of claim 1 comprising:
a second water spray located between the heat exchange means and said means for mixing, and means for passing the water from the second spray to the first-named spray.

3. In a method of eliminating vapor from a vapor laden process exhaust gas having an elevated temperature whereby it may be discharged into the atmosphere without the formation of plume, the steps comprising:

passing a heated vapor laden gas in heat exchanging relation with ambient air through a separating wall to effect cooling of the gas and to effect heating of the ambient air, additionally cooling the gas as it passes through said heat exchange relationship by passing the same through a water spray and draining the water of said spray into countercurrent contact with said gas and contact with said wall while the gas is in heat exchange relation with said ambient air, thereafter mixing the further cooled air with the ambient air after the latter has passed through the heat exchange relationship, and exhausting at least a portion of the mixture to the atmosphere.

4. A method of claim 3 comprising:
subjecting said gas to a second cooling and dehumidification by passage through a second water spray, and passing the water from the second spray through said first spray to increase the water temperature.

* * * * *